Aug. 19, 1952  R. MANISCALCO  2,607,496
MEAT TRAY SUPPORT AND PRICE SIGN HOLDER
Filed March 17, 1948
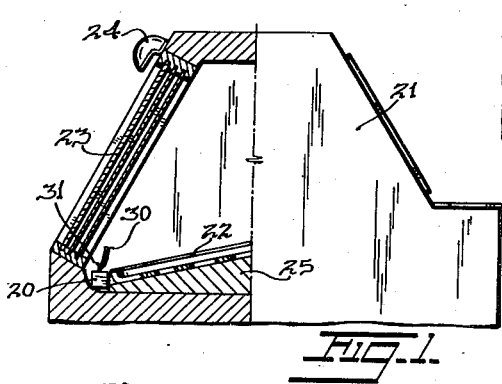
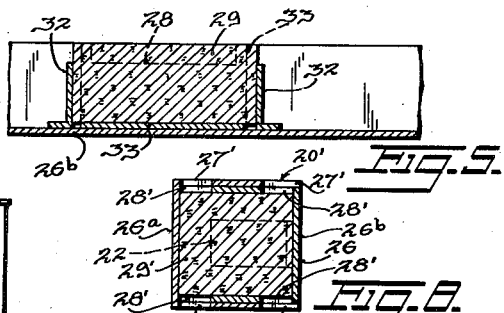
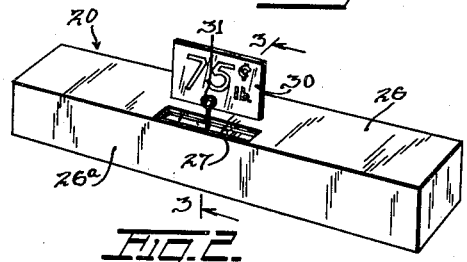
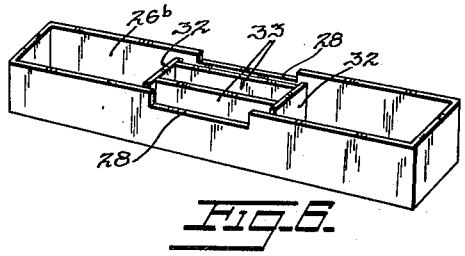
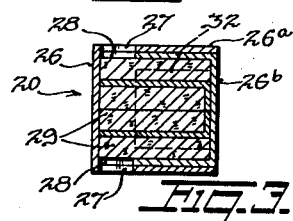
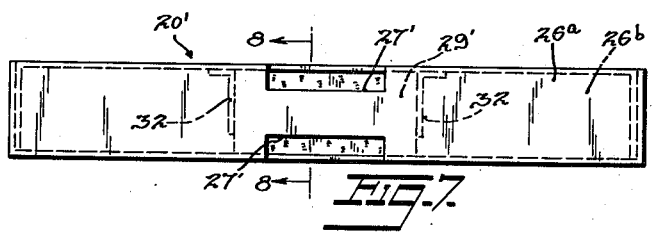
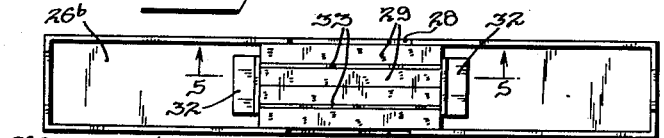
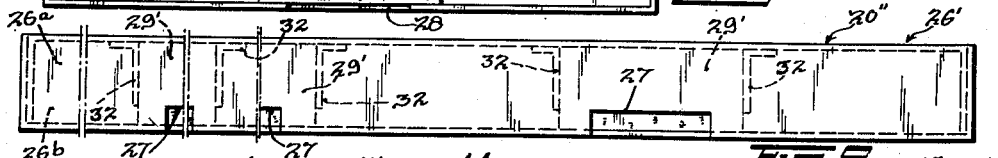
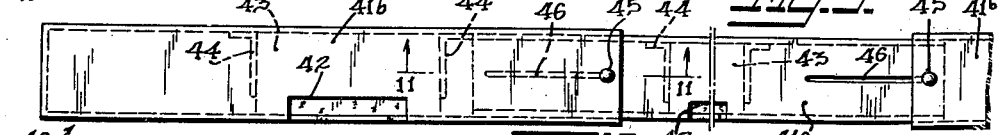
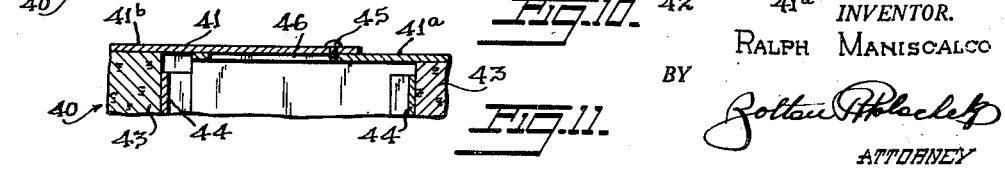
INVENTOR.
RALPH MANISCALCO
BY
ATTORNEY Patented Aug. 19, 1952

2,607,496

UNITED STATES PATENT OFFICE 2,607,496

MEAT-TRAY SUPPORT AND PRICE SIGN HOLDER

Ralph Maniscalco, Brooklyn, N. Y.

Application March 17, 1948, Serial No. 15,335

4 Claims. (Cl. 211—60)

1

This invention relates to a meat tray support.

It is customary for butchers in displaying meat, to arrange the meat to be displayed on flat shallow trays and rest the trays upon a forwardly inclined support in a refrigerator unit having a glass front so that a prospective customer may conveniently view the cuts of meat on display. In view of the inclined nature of the support, the trays have a tendency to slip forward on the support and to prevent this slipping butchers line the front of the refrigerator unit with fat, bacon or other small meat articles against which the front end of the trays rest and into which the price cards for the cuts of meat displayed are supported. This practice has proven unsatisfactory, as blood from the meats on the trays, especially from liver, kidneys and other excessively bloody meats, has a tendency to flow forward on the inclined trays and spill over the front edge thereof onto the fat, bacon or other small meat articles lining the front of the refrigerator unit rendering them valueless for sale purposes causing a considerable loss to butchers in spoiled cuts of meat.

It is an object of this invention to provide a novel support for engagement in the front of a refrigerator unit and against which the trays may rest to be supported on the inclined support with none of the objections set forth hereinbefore.

It is still another object of this invention to construct the support of non-corrosive metal, resinous plastic material, wood or other similar material in a manner to be easily washed in the event blood from the meat displayed on the tray should spill over the front edge of the tray.

Still another object of this invention proposes constructing the support in the form of a hollow box-like member containing a block of soft material exposed through appropriate openings formed in the box-like member in a manner to permit the price cards to be supported by the box-like member immediately before the tray.

Another object of the invention proposes constructing the supports in the form of individual supports for individual meat trays or in the form of support of desired length for insertion in the refrigerator unit in a manner to have a plurality of meat trays rested thereagainst.

It is an object of an embodiment of this invention to provide a support which is adjustable in length to extend before a plurality of trays and which may be collapsed into a smaller size when not in use in a manner to cut down its overall size and permit it to be stored in a minimum of space.

It is still another object of this invention to construct a meat tray support which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an end elevational view of a refrigerator unit for displaying meats having a portion thereof broken away to show a meat tray support in accordance with the present invention in position supporting a meat tray.

Fig. 2 is a perspective view of the meat tray support constructed in accordance with the present invention having a price card supported thereon.

Fig. 3 is a sectional view on the line 3—3 of Fig. 2, but with the price card removed.

Fig. 4 is a plan view of the inner section of the support, per se.

Fig. 5 is a partial sectional view on the line 5—5 of Fig. 4.

Fig. 6 is a perspective view of the inner section per se with the blocks of soft material removed.

Fig. 7 is a top plan view of the meat tray support constructed in accordance with a modification of the invention.

Fig. 8 is a sectional view on the line 8—8 of Fig. 7.

Fig. 9 is a view similar to Fig. 7, but illustrating a further modification of the meat tray support.

Fig. 10 is a plan view of a meat tray support constructed in accordance with a still further modification of the invention.

Fig. 11 is a partial longitudinal vertical sectional view taken on the line 11—11 of Fig. 10.

The meat tray support, in accordance with the present invention, is designated by the reference numeral 20 and in Fig. 1 is shown in position within a refrigerator unit 21 supporting a meat tray 22. The refrigerator unit 21 is conventional in construction and has an open front closed by spaced pieces of glass 23 with a source of light 24 above the open front for illuminating the interior of the unit 21 through the glass 23.

The meat tray 22 is rested upon a support 25 provided within the interior of the unit. The support 25 is inclined forwardly and downwardly so as to better display the cuts of meat on the tray to a prospective customer looking through the glass 23. In view of the inclined nature of the support 25, the tray 22 tends to slide forward; however, the front edge of the tray engages the meat tray support 20 arresting any possible forward motion of the tray 22.

The meat tray support 20 is in the form of a box-like member 26 having an outer section 26a and an inner section 26b. The inner section 26b fits snugly within the outer section 26a, but the sections may be separated when desired. The box-like member 26 is preferably constructed of non-corrosive metal, resinous plastic materials, wood or other similar materials which may be easily washed to remove any blood which might spill over the lower bottom edge of the meat tray 22 rested on the inclined support 25. Also, the top and bottom faces of the box-like member 26 may be differently colored, if desired, to improve the appearance of the display.

The box-like member 26 is hollow and the top and bottom walls of its sections 26a and 26b are formed with aligned openings 27 and 28, respectively. Blocks of soft material 29 are mounted in the inner section 26b of the box-like member 26 in aligned position with the openings 27 and 28 for supporting a price card.

In Fig. 2 a price card 30 is shown mounted upon the usual pin 31 which is stuck into the exposed blocks of soft material 29 through the aligned openings 27 and 28. On the drawing the blocks of soft material 29 are shown formed of cork, but this is by way of illustration only, as the blocks of soft material could also be formed of sponge rubber, soft pine, balsa wood, or other soft materials into which the pin 31 could be easily pressed.

Means is provided within the inner section 26b of the box-like member 26 for holding the blocks of soft material in an aligned position with the aligned openings 27 and 28. This means comprises L-shaped members 32 having one of their arms attached, as by soldering, welding, brazing or the like, to the wall of the section 26b. The free arms of the L-shaped members 32 extend along the ends of the blocks of soft material, to retain them in position. When the sections 26a and 26b of the box-like member 26 are disengaged from each the blocks of soft material 29 may be slipped from their engaged position between the L-shaped members 32 permitting the blocks to be interchanged, in the event the ones being used become damaged from repeated insertions of the pin 31.

Shelf-like members 33 are extended forwardly from the rear wall of the inner section 26b and extend along the inner faces of the blocks aligned with the openings 27 and 28, so as to more rigidly support the soft blocks being used to facilitate the insertion of the card pin and to protect the blocks 29 being stored, between the shelf-like members 33.

The meat tray support 20 is preferably constructed of a length substantially equal to or slightly less than the width of the average tray, so that one support 20 will serve to support each tray mounted in the refrigerator unit 21. Each support then provides a convenient supporting means for the price card relating to the meat displayed immediately behind the support.

In Figs. 7 and 8 a modified construction of the meat tray support 20' is illustrated in which the sections 26a and 26b of the box-like member 26 are formed with groups of aligned openings 27' and 28' adjacent each wall and in alignment with a single block of soft material 29', so that the meat tray support may be used with either wall directed forward and still provide a convenient support for the price card. The block of soft material 29' is mounted between the L-shaped member 32.

In other respects this form of the invention is similar to that previously described and like reference numerals identify like parts in each of the several views.

In the modification of the invention disclosed in Fig. 9, the meat tray support 20'' is similar to that disclosed in Fig. 2, except that the box-like member 26' has been made of a length to extend across the front of a group of meat trays. At spaced points along its length, the sections 26a and 26b of the box-like member 26' are formed with the aligned openings 27 and 28 in an aligned position with spaced blocks of soft material 29'; there being a group of openings and a block of soft material for each of the trays to be supported by the support 20''.

In other respects this form of the invention is similar to that disclosed in Figs. 2 to 6 and like reference numerals identify like parts in each of the several views.

In Figs. 10 and 11 a still further modification of the invention is disclosed, comprising a meat tray support 40 consisting of a box-like member 41 having a central section 41a and end sections 41b telescopically engaged on the ends of the central section 41a. The sections 41a and 41b have formed in their top and bottom walls and adjacent their front wall, openings 42 in alignment with blocks of soft material 43 contained within the sections 41a and 41b. The blocks of soft material 43 are retained in alignment with the openings 42 by means of L-shaped members 44 mounted on the back wall of the sections 41a and 41b.

Pins 45 extend inwards from the inner ends of the end sections 41b and engage complementary slots 46 formed in the adjacent walls of the ends of the central section 41a. The slots 46 extend longitudinally of the central section and guide sliding movements of the end sections 41b.

When the tray support member 40 is to be used its end sections 41b are extended as shown at the right of Fig. 10 enabling the support member to be used for more than one tray. When the support member 40 is not in use the end sections 41b may be slid onto the ends of the central section as shown at the left of Fig. 10 to reduce the overall size of the support member 40 enabling it to be stored in a smaller space.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A meat tray support, comprising a hollow elongated box-like member having an inner section with a top opening and an outer section fitted over said inner section closing said top opening, said sections having facially engaged longitudinally extending side walls, said side walls having short aligned openings midway of the length of said box-like member, a plurality of blocks of soft material in position within said inner section with their widths extended parallel to the side walls of said inner section, said blocks being shorter than the length of said box-like members, means within said inner section holding said blocks against longitudinal movement in a position in which they are in alignment with said aligned holes, so that pins of price tags can be extended through said aligned holes and into the outermost blocks, and means for reinforcing the outermost blocks and preventing the pins from being extended completely through said outermost block and into the next innermost blocks.

2. A meat tray support, comprising a hollow elongated box-like member having an inner section with a top opening and an outer section fitted over said inner section closing said top opening, said sections having facially engaged longitudinally extending side walls, said side walls having short aligned openings midway of the length of said box-like member, a plurality of blocks of soft material in position within said inner section with their widths extended parallel to the side walls of said inner section, said blocks being shorter than the length of said box-like members, means within said inner section holding said blocks against longitudinal movement in a position in which they are in alignment with said aligned holes, so that pins of price tags can be extended through said aligned holes and into the outermost blocks, and means for reinforcing the outermost blocks and preventing the pins from being extended completely through said outermost blocks and into the next innermost blocks, said holding means comprising L-shaped members secured in position within said inner section by one of their arms, said L-shaped members having their other arms extended at right angles to the length of said box-like member and spaced a distance equal to the length of said blocks to engage the ends of said blocks.

3. A meat tray support comprising a hollow elongated box-like member having an inner section with a top opening and an outer section fitted over said inner section closing said top opening, said sections having facially engaged longitudinally extending side walls, said side walls having short aligned openings midway of the length of said box-like member, a plurality of blocks of soft material in position within said inner section with their widths extended parallel to the side walls of said inner section, said blocks being shorter than the length of said box-like members, means within said inner section holding said blocks against longitudinal movement in a position in which they are in alignment with said aligned holes, so that pins of price tags can be extended through said aligned holes and into the outermost blocks, and means for reinforcing the outermost blocks and preventing the pins from being extended completely through said outermost blocks and into the next innermost blocks, said reinforcing means comprising shelf-like members fixedly mounted within said inner section and engaged between the adjacent faces of said outermost blocks and the next innermost blocks.

4. A meat tray support, comprising a hollow elongated box-like member having an inner section with a top opening and an outer section fitted over said inner section closing said top opening, said sections having facially engaged longitudinally extending side walls, said side walls having short aligned openings located midway of the length of said box-like member, a plurality of blocks of soft material in position within said inner section with their widths extended parallel to the side walls of said inner section, said blocks being shorter than the length of said box-like members, L-shaped members secured in position within said inner section by one of their arms, said L-shaped members having their other arms extended at right angles to the length of said box-like member and spaced a distance equal to the length of said blocks to engage the ends of said blocks holding said blocks against longitudinal movement in a position in which they are in alignment with said aligned holes, so that pins of price tags can be extended through said aligned holes and into the outermost blocks, and shelf-like members fixedly mounted within said inner section and engaged between the adjacent faces of said outer-most blocks and the next innermost blocks for reinforcing the outermost blocks and preventing the pins from being extended completely through said outermost blocks and into the next innermost blocks.

RALPH MANISCALCO.

REFERENCES CITED

The following references are of record in the file of this patent:

UNITED STATES PATENTS

| Number | Name | Date |
| --- | --- | --- |
| 460,445 | Nessler | Sept. 29, 1891 |
| 885,242 | Gressner | Apr. 21, 1908 |
| 1,725,999 | Ryder | Aug. 27, 1929 |
| 1,746,000 | Lee | Feb. 4, 1930 |
| 1,859,095 | Katzenmoyer | May 17, 1932 |
| 1,966,734 | Rosen | July 17, 1934 |

FOREIGN PATENTS

| Number | Country | Date |
| --- | --- | --- |
| 193,044 | Switzerland | Sept. 30, 1937 |
| 203,869 | Great Britain | Sept. 20, 1923 |